United States Patent [19]

Fischer

[11] Patent Number: 5,605,422
[45] Date of Patent: Feb. 25, 1997

[54] NAIL WITH EXPANSION REGION

[75] Inventor: Artur Fischer, Waldachtal, Germany

[73] Assignee: fischerwerke Artur Fischer GmbH & Co KG, Waldachtal, Germany

[21] Appl. No.: 401,179

[22] Filed: Mar. 9, 1995

[30]    Foreign Application Priority Data

Mar. 28, 1994 [DE] Germany .......................... 44 10 793.5

[51] Int. Cl.⁶ .................................................. F16B 15/00
[52] U.S. Cl. .............................. 411/357; 411/448; 411/22
[58] Field of Search .................................. 411/21, 22, 29,
411/75, 57, 60, 354, 446, 448, 451, 452,
487, 922

[56]              References Cited

U.S. PATENT DOCUMENTS

| 250,187 | 11/1881 | Barnes | 411/446 |
|---|---|---|---|
| 613,797 | 11/1898 | Dodson | 411/354 |
| 1,021,794 | 4/1912 | Pleister | 411/21 |
| 1,108,483 | 8/1914 | Abramson | 411/448 |
| 1,214,578 | 2/1917 | O'Bryan | 411/357 |
| 1,215,259 | 2/1917 | Draper | 411/357 |
| 1,642,006 | 9/1927 | Azzara | 411/358 |
| 2,114,879 | 4/1938 | Hojnowski | 411/22 |
| 2,719,452 | 10/1955 | Jones | 411/451 |

FOREIGN PATENT DOCUMENTS

| 2308821 | 11/1976 | France | 411/357 |
|---|---|---|---|
| 2453467 | 5/1975 | Germany . | |
| 3222829 | 12/1983 | Germany . | |
| 3345331 | 6/1985 | Germany . | |
| 3345696 | 6/1986 | Germany . | |
| 3622651 | 9/1987 | Germany . | |
| 3714008 | 11/1988 | Germany . | |
| 18680 | of 1899 | United Kingdom | 411/448 |

*Primary Examiner*—Steven N. Meyers
*Assistant Examiner*—Gary Estremsky

[57]            ABSTRACT

A nail comprises a shank having an expansion portion with two curved expansion limbs defining a free space therebetween, a first straight shank portion and a second straight shank portion located correspondingly before and after the expansion region, the free space being formed as a longitudinal notch starting from the first straight shank portion and extending to the forward end, the notch having a notch base rising in direction toward the forward nail end, and a wedge arranged in the longitudinal notch and bearing against the notch base, the wedge having an upper edge slightly projecting beyond the shank and being displaceable in direction toward and along the rising notch base.

10 Claims, 1 Drawing Sheet

NAIL WITH EXPANSION REGION

BACKGROUND OF THE INVENTION

The present invention generally relates to nails with an expansion region.

Nails of the above mentioned general type are known in the art. A fixing element formed as a nail is disclosed for example in the German patent document DE 33 45 331 A1 and has an expansion region provided in its forward nail end and formed by two outwardly curved limbs which extend at a distance from one another. Such a fixing element is anchored by its shank driven into a pre-drilled hole in masonry or the like. When the shank is driven into the drilled hole, the expansion limbs are pressed together inwards by the wall of the drilled hole and, by means of an insert situated between the expansion limbs, an increased pressure can be produced by the expansion limbs against the wall of the drill hole. The expansion limbs of the fixing element are pressed against the wall of the drilled hole after being driven in, by means of the plastic and/or resilient restoring force of the insert. Therefore a correspondingly high holding force is obtained. However, because of the insert the driving-in resistance to the nail formed in accordance with the prior art is very high.

SUMMARY OF THE INVENTION

Accordingly, it is an object of the present invention to provide a nail with an expansion region which avoids the disadvantages of the prior art.

More particularly, it is an object of the present invention to provide a nail with an expansion region which is formed so that the nail can be inserted without any problem into a drilled hole in masonry and has high holding values, and which at the same time allows subsequent expansion.

In keeping with these objects and with others which will become apparent hereinafter, one feature of the present invention resides, briefly stated, in a nail having an expansion region, in which in accordance with the present invention a free space is formed as a longitudinal notch starting from a straight shank portion situated before an expansion region and extends to the forward nail end, the notch base of the longitudinal notch rises in direction of the nail end, a wedge in the longitudinal notch bears on the notch base and has an upper edge projecting slightly beyond the shank, whereas the wedge is displaceable in direction of the nail end along the rising notch base.

Since the wedge is inserted into the longitudinal notch of the shank, the wedge braces itself in the drilled hole with the wall of the hole. If widening of the drilled hole now occurs as a result of the formation of a crack in the masonry, the effect of a nail drawn slightly out of the drilled hole is that the wedge immovably braced in the drilled hole is pressed to a greater extent against the wall of the drilled hole by the rising notch base of the longitudinal notch. The nail therefore braces itself firmly again in the drilled hole, so that in this case the nail has subsequent expansion behavior.

In accordance with another feature of the present invention, the upper edge of the wedge projecting beyond the shank is preferably provided with teeth. The experiments have shown that such toothing produces an optimal subsequent expansion behavior.

For preventing pressing of the wedge outwards against the wall of the drilled hole and the nail is driven into a drilled hole in masonry, the inventive nail is provided with a stop at the end of the longitudinal notch nearest the nail head. The wedge bears against the stop in its deepest position.

Furthermore, a retaining element can firmly hold the wedge detachably in the longitudinal notch before the nail is driven in. Therefore the wedge does not accidentally fall out of the longitudinal notch. Lateral indentations on the border of the longitudinal notch produce a frictional connection with the inserted wedge and serve as retaining elements.

In the inventive nail with the laterally protruding expansion limbs, optimal holding values are obtained for the nail provided with a wedge, and the nail has high safety reserves also in problem areas. The laterally protruding expansion limbs, when the nail is driven into a drilled hole, are pressed inwards by plastic and resilient deformation. Therefore a frictional connection with the wall of the drilled hole is formed. High holding values are already produced because of the resilient plastic deformation portion of the expansion region. By means of the resilient deformation portion, the nail can also compensate for a widening of the drilled hole, for example, because of the formation of a crack, without longitudinal displacement in the drilled hole. If displacement of the nail occurs because of the deformation of a crack in conjunction with high tensile loads, the wedge projecting of the wedge engages with the wall of the drilled hole and, as the longitudinal displacement of the nail increases, it is pressed even more strongly against the wall of the drilled hole until the nail is again held absolutely firmly in the drilled hole.

In accordance with another feature of the present invention, the expansion limbs are preferably outwardly curved by notching the straight shank symmetrically relative to the longitudinal axis of the shank, and a smooth transition is provided at both ends of the expansion region to the straight shank sections. It is especially advantageous for the outer surface of the expansion limbs to be made approximately circular in cross-section, with a diameter slightly larger than the shank diameter. The rounding in the expansion region thus corresponds approximately to the rounding of the shank and of the wall of the drilled hole, so that there is also obtained in the expansion region a uniform, flat fit against the wall of the drilled hole. By means of flattened portions of the longitudinal edges of the expansion limbs the inward deflection of the expansion limbs during the driving of the nail into the drilled hole is facilitated.

Still another feature of the present invention is that the longitudinal notch can have a U-shaped cross-section, the inserted wedge likewise fitting with a U-shaped profile in the longitudinal notch extending beyond the expansion region. In the region in which the expansion limbs protrude outwards on the shank, there is a free space between the wedge and the inner wall of the expansion limbs, so that the expansion limbs can be resiliently pressed together.

In a further embodiment of the invention, the expansion region of the nail can be provided with a longitudinal rib which is triangular in profile and which is arranged opposite the longitudinal notch. By means of this longitudinal rib projecting over the outer periphery of the expansion region, a further bearing in the drilled hole is obtained in addition to the two expansion limbs, so that on the one hand, because of the outer support distributed in the expansion region, a centering effect is produced, and on the other hand an increased compression of the expansion limbs, and especially of the wedge lying in the longitudinal notch is obtained. Drilled hole tolerances are likewise compensated for to a greater degree by means of the longitudinal rib. In the case of narrower drilled holes, the longitudinal rib digs in more and in the case of wider drilled holes it digs in less into the wall of the drilled hole, so that a friction which remains the same is produced in the expansion region, extensively independently of the diameter of the drilled hole.

In order to facilitate the introduction, and driving into the drilled hole, of the nail with the longitudinal rib, it is expedient for the longitudinal rib to taper away at a location offset from the forward end of the nail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
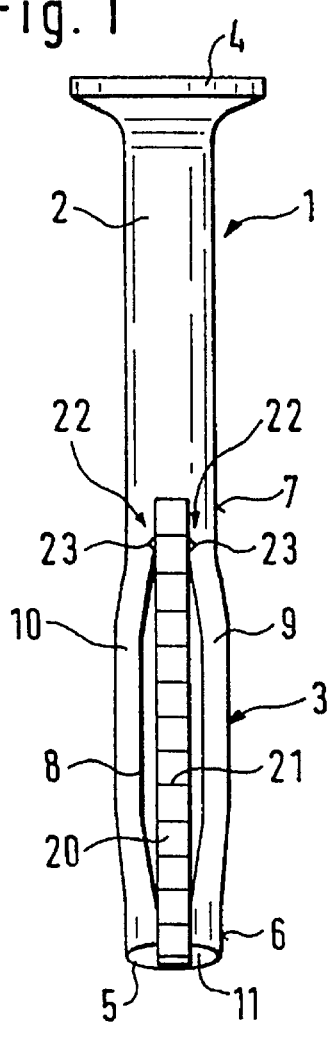
FIG. 1 is a view showing a nail in accordance with the present invention with a wedge lying in a longitudinal notch of its expansion region.

A nail in accordance with the present invention is identified as a whole with reference numeral 1. It has a shank 2 with an expansion region 3 and a nail head 4. The expansion region 3 is set back slightly from the forward end 5 of the nail, so that a straight portion 6 remains between the forward end 5 and the expansion region 3. A longer straight shank portion 7 extends between the expansion region 3 and the nail head 4.

The nail 1 is composed of metal. It is notched by notching operation, for example by means of a notching tool in the expansion region 3, so that a longitudinal notch 8 with a U-shaped cross-section is provided. The longitudinal notch 8 is bounded by lateral expansion limbs 9 and 10 which protrude, curving outwardly, on the shank 2. At the nail end 5, the nail 1 has an inclined surface 11.

A wedge 20 is located in the longitudinal notch 8 and provided with teeth at an upper edge 21. For preventing accidental falling of the wedge 20 out of the longitudinal notch 8, stampings 23 are formed on the shank 10 opposite to a border 22 of the notch. The stampings 23 form retaining elements for the wedge 20 and clamp the wedge firmly but detachably in the longitudinal notch 8.

Figure 2:
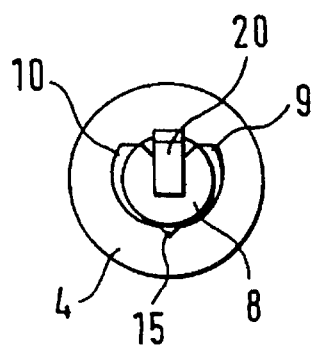
FIG. 2 is a plan view of the forward end of the inventive nail of FIG. 1.

The U-shape of the longitudinal notch can be clearly seen in FIG. 2, with the wedge 20 received in it. A longitudinal rib 15 is provided on the opposite of the shank 1 from the wedge 20. The longitudinal rib 15 tapers toward the nail end 5 as shown in FIG. 3.

Figure 3:
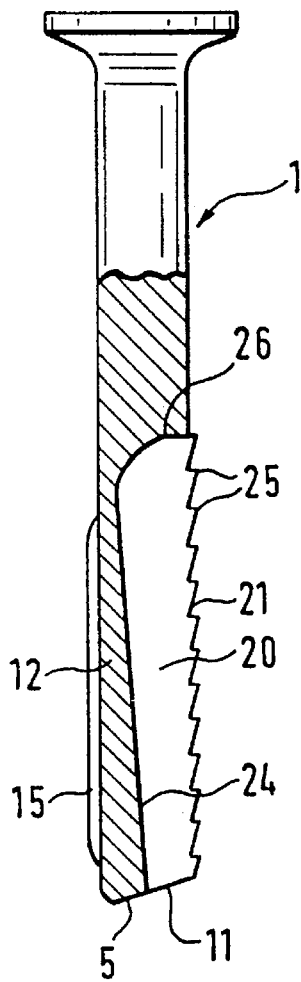
FIG. 3 is a longitudinal section through the inventive nail of FIG. 1.

As can be clearly seen from FIG. 3, the U-shaped longitudinal notch has a notch base 24 which rises toward the nail end 5. The wedge 20 lying in the longitudinal notch 8 tapers correspondingly in the direction of the nail end 5, so that it projects uniformly on the shank 1 with teeth 25 stamped out on its upper edge 21.

A stop 26 is formed at the opposite end of the longitudinal notch 8 from the end 5. The wedge 20 bears against the stop 26 when the nail 1 is driven in.

It will be understood that each of the elements described above, or two or more together, may also find a useful application in other types of constructions differing from the types described above.

While the invention has been illustrated and described as embodied in a nail with an expansion region, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A nail, comprising a shank having a first straight shank portion located at a forward insertion end of the shank and a second straight shank portion located at an opposite end of the shank with an expansion region defined therebetween; the expansion region having two curved expansion limbs defining sidewalls of a longitudinal notch therebetween; said expansion limbs protruding outwardly from said shank effectively defining a shank portion of larger diameter than said straight shank portions; the notch having a notch base whose depth increases in a direction from the forward insertion end of the nail towards the opposite end; and a wedge arranged in said longitudinal notch and bearing against said notch base, said wedge having an upper edge projecting slightly beyond said longitudinal notch of said shank and adapted to be displaceable in a direction toward said insertion end.

2. A nail as defined in claim 1, wherein said upper edge of said wedge is provided with teeth.

3. A nail as defined in claim 1, wherein said wedge has a region located at an end of said longitudinal notch which is remote from said forward end; and further comprising a stop against which said region of said wedge bears.

4. A nail as defined in claim 1; and further comprising at least one retaining element which engages with said wedge and firmly holds said wedge in said longitudinal notch.

5. A nail as defined in claim 1, wherein said expansion limbs are curved outwardly by notching said shank symmetrically relative to a longitudinal axis of the shank, and a smooth transition is provided at both ends of said expansion region to said straight shank portions.

6. A nail as defined in claim 1, wherein said expansion region is rounded approximately in a circular shape in a cross-section, said expansion limbs having flat portions on their longitudinal edges.

7. A nail as defined in claim 1, wherein said longitudinal notch is formed as a U-shaped longitudinal groove.

8. A nail as defined in claim 1, wherein said expansion region opposite to said longitudinal notch is provided with a longitudinal rib.

9. A nail as defined in claim 1, wherein said longitudinal rib has a triangular profile.

10. A nail as defined in claim 1, wherein said longitudinal rib tapers away at a location which is offset from said forward end.

\* \* \* \* \*